(12) United States Patent
Satzger et al.

(10) Patent No.: US 11,850,915 B2
(45) Date of Patent: Dec. 26, 2023

(54) METHOD FOR THE THERMAL CONDITIONING OF AN INTERNAL COMBUSTION ENGINE AND/OR OF A PASSENGER COMPARTMENT OF A VEHICLE, AND VEHICLE

(71) Applicant: Bayerische Motoren Werke Aktiengesellschaft, Munich (DE)

(72) Inventors: Peter Satzger, Landsberg am Lech (DE); Felix Schedel, Gauting (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 139 days.

(21) Appl. No.: 15/971,604

(22) Filed: May 4, 2018

(65) Prior Publication Data

US 2018/0251003 A1 Sep. 6, 2018

Related U.S. Application Data

(60) Division of application No. 14/642,070, filed on Mar. 9, 2015, now abandoned, which is a continuation of
(Continued)

(30) Foreign Application Priority Data

Sep. 10, 2012 (DE) .................... 10 2012 215 971.1

(51) Int. Cl.
*B60H 1/00* (2006.01)

(52) U.S. Cl.
CPC ..... *B60H 1/00921* (2013.01); *B60H 1/00314* (2013.01); *B60H 2001/00307* (2013.01);
(Continued)

(58) Field of Classification Search
CPC ............ B60H 1/00271; B60H 1/00314; B60H 1/00921; B60H 1/02; B60H 1/03;
(Continued)

(56) References Cited

U.S. PATENT DOCUMENTS 3,446,032 A * 5/1969 Bottum .................. F25B 40/00
62/513
4,645,908 A * 2/1987 Jones .................. F24D 11/0214
392/340
(Continued)

FOREIGN PATENT DOCUMENTS

CN 101443205 A 5/2009
CN 102216413 A 10/2011
(Continued)

OTHER PUBLICATIONS

International Search Report dated Nov. 18, 2013 (Two (2) pages).
(Continued)

*Primary Examiner* — Travis Ruby
(74) *Attorney, Agent, or Firm* — Crowell & Moring LLP

(57) ABSTRACT

Thermal conditioning of a combustion engine of a vehicle is achieved by means of a fluid circuit or a sub-circuit of the fluid circuit and/or the air flowing into a passenger compartment of the vehicle by means of a heat pump circuit. In at least one operational state of the vehicle, heat is transferred from the fluid circuit or the sub-circuit of the fluid circuit to the heat pump circuit.

7 Claims, 5 Drawing Sheets

Related U.S. Application Data application No. PCT/EP2013/067283, filed on Aug. 20, 2013.

(52) U.S. Cl.
CPC ............. *B60H 2001/00928* (2013.01); *B60H 2001/00949* (2013.01)

(58) Field of Classification Search
CPC ............... B60H 1/034; B60H 1/00885; B60H 1/00899; B60H 2001/00307; B60H 2001/00928; B60H 2001/00949
See application file for complete search history.

(56) References Cited

U.S. PATENT DOCUMENTS

| | | | | |
|---|---|---|---|---|
| 6,047,770 A * | 4/2000 | Suzuki | ............... | B60H 1/00007 165/202 |
| 6,405,793 B1 * | 6/2002 | Ghodbane | .......... | B60H 1/00007 165/140 |
| 6,516,623 B1 * | 2/2003 | Collier | ............... | B60H 1/00507 62/238.7 |
| 6,640,889 B1 * | 11/2003 | Harte | ................. | B60H 1/00885 165/202 |
| 6,913,067 B2 * | 7/2005 | Hesse | ...................... | B60H 1/08 165/202 |
| 7,048,044 B2 * | 5/2006 | Ban | .................... | B60H 1/00314 165/202 |
| 7,055,590 B2 * | 6/2006 | Hara | .................. | B60H 1/00314 165/202 |
| 7,536,869 B2 * | 5/2009 | Inaba | ................. | B60H 1/00885 62/238.6 |
| 7,716,934 B2 * | 5/2010 | Ebara | ................. | B60H 1/00885 62/113 |
| 7,789,176 B2 * | 9/2010 | Zhou | .................. | B60H 1/00278 180/65.1 |
| 8,959,936 B2 * | 2/2015 | Richter | .............. | B60H 1/00064 62/224 |
| 2001/0048031 A1 * | 12/2001 | Noro | ........................ | F24H 4/04 237/2 B |
| 2003/0010488 A1 * | 1/2003 | Watanabe | .......... | B60H 1/00335 165/202 |
| 2003/0154730 A1 * | 8/2003 | Leuthner | ............ | B60H 1/00907 62/160 |
| 2003/0177778 A1 * | 9/2003 | Hesse | ...................... | B60H 1/08 62/324.1 |
| 2004/0011070 A1 * | 1/2004 | Satzger | ............. | B60H 1/00885 62/323.1 |
| 2004/0055320 A1 * | 3/2004 | Horstmann | ......... | B60H 1/00314 62/244 |
| 2006/0053814 A1 * | 3/2006 | Naik | ..................... | B60H 1/004 62/241 |
| 2006/0080985 A1 * | 4/2006 | Inaba | ................. | B60H 1/00885 62/238.6 |
| 2006/0081355 A1 * | 4/2006 | Horstmann | ............ | B60H 1/025 165/43 |
| 2008/0196877 A1 * | 8/2008 | Zeigler | .............. | B60H 1/00907 165/202 |
| 2008/0202722 A1 * | 8/2008 | Feuerecker | ........ | B60H 1/00907 165/41 |
| 2008/0223064 A1 * | 9/2008 | Feuerecker | ........ | B60H 1/00921 62/324.2 |
| 2009/0071428 A1 * | 3/2009 | Kamiyama | ........ | B60H 1/00314 123/142.5 R |
| 2009/0205353 A1 * | 8/2009 | Takahashi | .......... | B60H 1/00899 62/324.1 |
| 2010/0281901 A1 | 11/2010 | Kawase et al. | | |
| 2011/0174000 A1 * | 7/2011 | Richter | .............. | B60H 1/00064 62/93 |
| 2011/0232890 A9 * | 9/2011 | Gering | ............... | B60H 1/00278 165/202 |
| 2012/0174602 A1 | 7/2012 | Olivier et al. | | |
| 2012/0204596 A1 * | 8/2012 | Takenaka | .................. | F25B 6/04 62/510 |
| 2012/0205088 A1 * | 8/2012 | Morisita | .................... | B60L 1/02 62/243 |
| 2018/0251003 A1 * | 9/2018 | Satzger | .............. | B60H 1/00314 |

FOREIGN PATENT DOCUMENTS

| | | |
|---|---|---|
| DE | 102 39 876 A1 | 3/2004 |
| DE | 10 2006 042 788 A1 | 3/2008 |
| DE | 10 2010 023 178 A1 | 12/2011 |
| DE | 10 2010 030 746 A1 | 1/2012 |

OTHER PUBLICATIONS

German Office Action dated May 3, 2013 (Five (5) pages).
Chinese Office Action issued in Chinese counterpart application No. 201380031020.9 dated Mar. 2, 2016, with English translation (Fifteen (15) pages).
Chinese Office Action issued in Chinese counterpart application No. 201380031020.9 dated Nov. 15, 2016, with English translation (Eleven (11) pages).
Chinese Office Action issued in Chinese counterpart application No. 201380031020.9 dated Apr. 5, 2017, with English translation (Ten (10) pages).

* cited by examiner

METHOD FOR THE THERMAL
CONDITIONING OF AN INTERNAL
COMBUSTION ENGINE AND/OR OF A
PASSENGER COMPARTMENT OF A
VEHICLE, AND VEHICLE

CROSS REFERENCE TO RELATED APPLICATIONS

This application is a divisional of U.S. application Ser. No. 14/642,070, filed on Mar. 9, 2015, which is a continuation of PCT International Application No. PCT/EP2013/067283, filed Aug. 20, 2013, which claims priority under 35 U.S.C. § 119 from German Patent Application No. 10 2012 215 971.1, filed Sep. 10, 2012, the entire disclosures of which are herein expressly incorporated by reference.

BACKGROUND AND SUMMARY OF THE INVENTION

The present invention relates to a method for the thermal conditioning of a combustion engine and/or of a passenger compartment of a vehicle and to a commensurate vehicle according to the features set forth herein.

In hybrid vehicles (e.g., "plug-in hybrid vehicles) and electric vehicles with a so-called "range extender" (generator driven by combustion engine), the fundamental problem arises at low ambient temperatures that in phases in which only the electric motor is used for driving and the combustion engine is shut off, there is not enough "waste heat" available in order to appropriately heat the passenger compartment. In different hybrid vehicle designs, an electric heating device is therefore provided for additional heating. When operated, however, it leads to a significant reduction of the "electric range" of the vehicle. To reduce the energy required for the "electric heating" of the interior passenger compartment, heat pumps, among other things, have been considered that produce greater heat output compared to purely electric heaters with the same electrical power consumption.

In DE 10 2010 030 746 A1, it was proposed to preheat the combustion engine of a hybrid vehicle before commencement of travel by means of an electric heater to be connected to the stationary power grid and to use the combustion engine as a heat store in order to reduce the heat output requirement immediately after commencement of travel. The quantity of heat intermediately stored in the combustion engine can be used during purely electric driving operation to support the electric heater, which reduces the electric power input and increases the range of the vehicle accordingly.

It is the object of the invention to provide:
a) a method for the thermal conditioning of a combustion engine of a vehicle and/or of the air flowing into a passenger compartment of the vehicle that enables the energy efficiency of the vehicle to be further improved, and
b) a commensurate vehicle.

This object is achieved by the features of the independent claims Advantageous embodiments and developments of the invention can be found in the sub-claims.

The starting point of the invention is a vehicle with a combustion engine, a fluid circuit ("cooling circuit") that is provided for the cooling and/or preheating of the combustion engine, and a heat pump circuit. The fluid circuit and the heat pump circuit are used for the thermal conditioning of the combustion engine and/or for the thermal conditioning of the air flowing into the passenger compartment of the vehicle. The term "thermal conditioning" is to be understood, for example, as a preheating of the (cold) combustion engine before commencement of travel or a heating of the air blown into the passenger compartment.

The invention is based on the idea of coupling the fluid circuit and the heat pump circuit thermally with each other and transferring heat at least in some operational states of the vehicle from the fluid circuit or a sub-circuit of the fluid circuit to the heat pump circuit. In other words, the fluid circuit or a sub-circuit of the fluid circuit is used at least in some operational states as a heat source for the heat pump circuit. This is worthy of consideration particularly at low outside temperatures because, at low outside temperatures, the ambient air can be used as a heat source for the heat pump circuit only to a limited extent, that is, only with a relatively unfavorable overall level of efficiency.

According to one development of the invention, heat produced by the heat pump circuit is transferred via a heat exchanger to a (second) sub-circuit and from the second sub-circuit via a heating heat exchanger to the air flowing into the passenger compartment of the vehicle.

As already mentioned above, the thermal coupling of the fluid circuit and the heat pump circuit can also be used to preheat the combustion engine through discharge of heat produced by the heat pump circuit to the fluid circuit via a heat exchanger.

The invention is explained in further detail below in conjunction with the drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
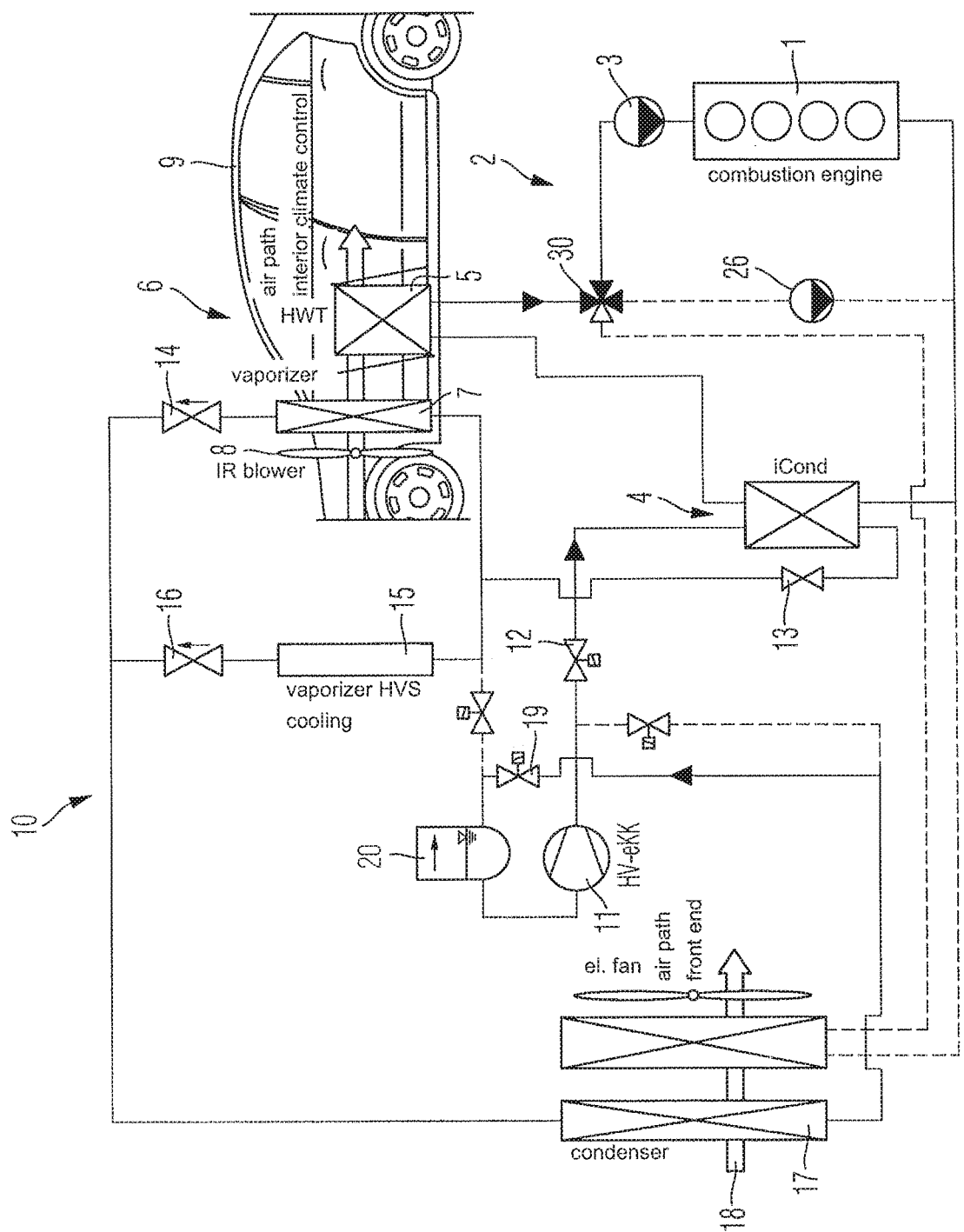
FIGS. 1-5 depict various exemplary embodiments according to the invention in which a heat pump circuit is respectively coupled with a fluid circuit of a combustion engine.

FIG. 1 shows a schematic representation of a vehicle with a combustion engine 1 that can be cooled by a fluid circuit 2 ("cooling circuit") and can heat the vehicle interior or passenger compartment. The fluid circuit has a coolant pump 3 that pumps liquid coolant (e.g., water/glycol mixture) through cooling channels of the combustion engine 1. Furthermore, a coolant/refrigerant heat exchanger 4, hereinafter also called "second heat exchanger" and the function of which will be explained in further detail below, is arranged in the fluid circuit 2. cooling fluid is pumped from the coolant pump 3 through the combustion engine 1 and further through the second heat exchanger 4 into a heating heat exchanger 5 of an air conditioning unit 6, which additionally has a refrigerant vaporizer 7 and a blower 8.

In the heating heat exchanger 5, the coolant heated by the waste heat of the combustion engine 1 delivers heat to the air flowing into a passenger compartment of a vehicle 9. The cooled coolant flows from the heating heat exchanger 5 back to the suction side of the coolant pump 3. In this way, the passenger compartment can be "preconditioned" (preheated) when the vehicle is parked, provided that an appropriate quantity of residual heat is stored in the combustion engine 1.

If the combustion engine 1 is cold, that is, if its temperature is equal to the ambient temperature, then the air in the passenger compartment of the vehicle 9 and/or the combustion engine 1 can be preconditioned or preheated by means of a heat pump circuit 10.

The heat pump circuit 10 has a refrigerant compressor 11. The refrigerant compressor 11 can be a "high-voltage refrigerant compressor," i.e., a purely electrically driven refrigerant compressor. The refrigerant compressor 11 pumps compressed refrigerant via a valve 12 through the second heat exchanger 4. As a result of the compression of the refrigerant, it is heated. In the heat exchanger 4, the heated refrigerant delivers heat to the coolant circulated by pumping in the fluid circuit 2, whereby it is heated. A heat transfer thus takes place from the heat pump circuit 10 to the fluid circuit 2. The heated coolant flows through the heating heat exchanger 5, thus heating the air flowing into the passenger compartment of the vehicle 9. The coolant is then pumped through the combustion engine 1, whereby it, too, is heated.

After flowing through the heat exchanger 4, the refrigerant flows through a first expansion element 13, whereby the refrigerant is cooled off. A portion of the cooled and expanded refrigerant flows through a first branch of the heat pump circuit, which contains the vaporizer 7 and another expansion element 14, in which the refrigerant is further expanded and cooled. The other portion of the refrigerant flows through a second compressor branch, which has a compressor 15 and another expansion element 16. The compressor 15 can be used, for example, for cooling a high-voltage battery (not shown) of the vehicle. In contrast, in the exemplary embodiment shown in FIG. 1, the vaporizer 7 is an integral component of an air conditioning unit that also comprises the heating heat exchanger 5. After the expansion of the refrigerant in the expansion elements 14 and 16, the refrigerant flows through an outer heat exchanger 17, in which it picks up heat from the ambient air 18. The refrigerant flows from the outer heat exchanger 17 through a valve 19 and an accumulator 20 to the suction side of the refrigerant compressor 11.

In the operating state shown in FIG. 1, and ambient air 18 thus serves as a heat source. The heat sink is formed by the air flowing into the vehicle 9 and by the combustion engine 1. The distribution of the heat between the combustion engine 1 and the passenger compartment is done through a valve 30, a pump 26, an IR housing (see drawing) or the control of air flaps in the air conditioning unit and can therefore be varied between 0% and 100%.

Figure 2:
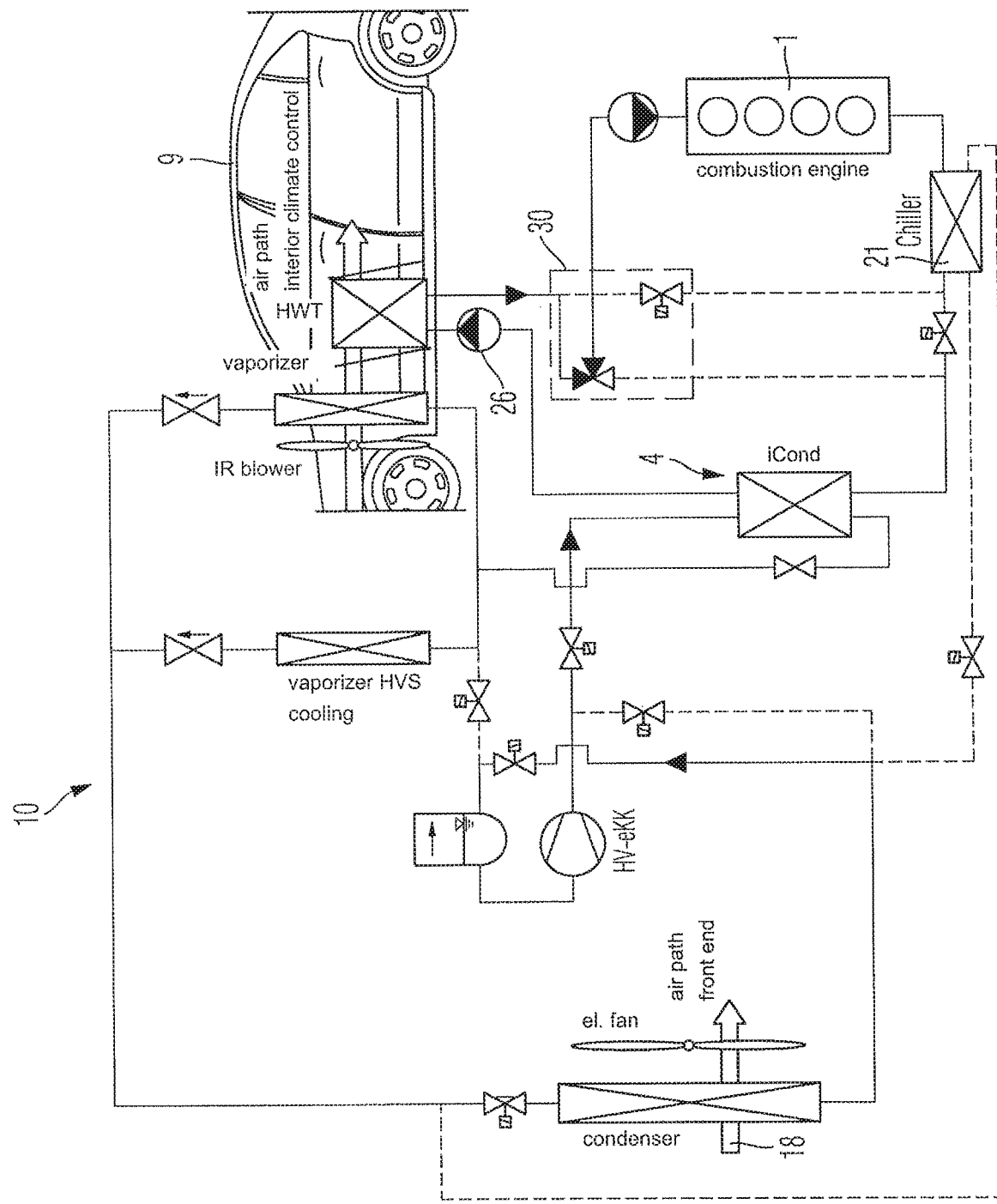

In the system illustrated in FIG. 2, another heat exchanger 21 (referred to as a "chiller" in the figures) is additionally provided which, in order to differentiate it from the "second heat exchanger" 4, is referred to below as "first heat exchanger" 21 or as "chiller." In a first possible operating state, the first heat exchanger 21 is passive, that is, the hot coolant coming from the combustion engine 1 flows through it. If the combustion engine 1 is warm, the thermal energy stored therein can be used to heat the passenger compartment of the vehicle 9.

If the combustion engine is cold, the passenger compartment of the vehicle 9 and/or the combustion engine 1 can be preconditioned or preheated analogously to FIG. 1 by means of the heat pump circuit 10, in which case, analogously to the above description, the ambient air 18 acts as a heat source of the heat pump circuit 10 and the passenger compartment of the heat pump circuit 10 and/or the combustion engine 1 act as a heat sink for the heat pump circuit 10. If the combustion engine 1 acts as a heat sink, then it serves as a heat store, in which case it is available for heating the passenger compartment as an operationally reliable heat source. The residual engine heat shortens the warm-up time, which contributes to a reduction in consumption when starting the combustion engine 1.

Figure 3:
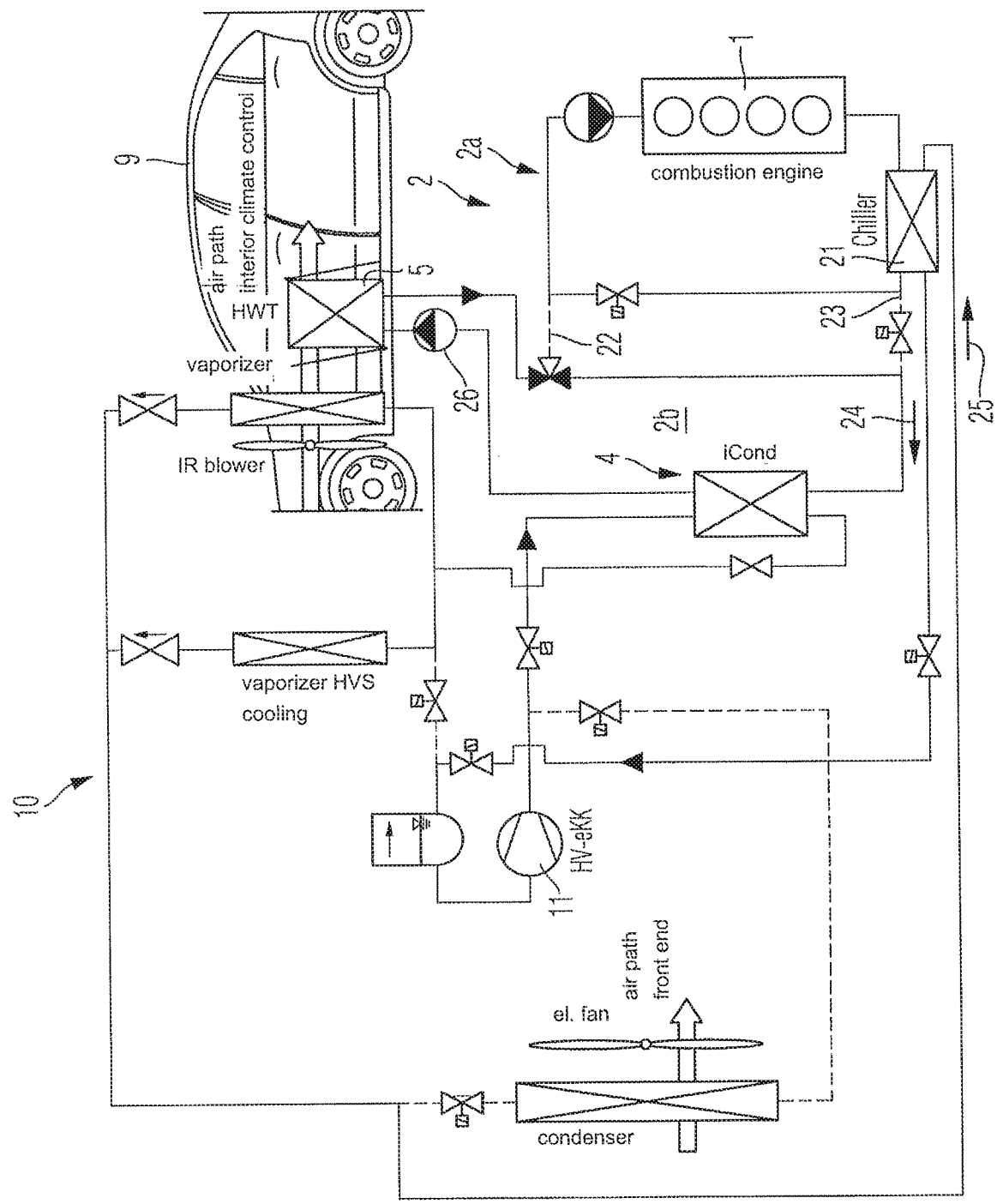

FIG. 3 shows an operational state in which the fluid circuit 2, through closing or blocking two fluid connections, is connected to fluid circuits 2a, 2b that are separated from each other. The fluid circuit 2a is referred to below as the first fluid circuit flowing through the combustion engine 1, and the fluid circuit 2b is referred to as the second fluid circuit flowing through the heating heat exchanger 5.

This operational state, in which the two fluid connections 22, 23 are blocked, is worthy of consideration if the heat from the combustion engine 1 is to be used by means of a heat pump for heating the passenger compartment of the vehicle 9. The coolant coming from the combustion engine 1 and circulated by pumping in the first fluid circuit 2 first flows through the first heat exchanger 21. In the first heat exchanger 21, the coolant delivers heat to the refrigerant of the heat pump circuit 10. The direction of flow of the refrigerant is indicated by arrows 24, 25. The refrigerant heated with the heat from the first sub-circuit 2a flows to the refrigerant compressor 11, where it is compressed and heated. In the second heat exchanger 4, the heated refrigerant delivers heat to the second sub-circuit 2b of the fluid circuit 2. Another coolant pump 26 is provided in the second sub-circuit 2b that pumps the heated coolant through the heating heat exchanger 5 and, from there, back to the second heat exchanger 4.

In this mode of operation, the combustion engine 1 acts as a heat source. Heat stored in the combustion engine 1 is delivered to the heat pump circuit 10 and finally fed via the second sub-circuit 2b to the air flowing into the passenger compartment of the vehicle 9.

This mode of operation is relevant in three vehicle states:
a) The combustion engine 1 was preheated before commencement of travel according to the mode of operation described in FIG. 1. In the mode of operation of FIG. 3, due to the higher temperature level, this heat source can enable more efficient heat pump operation than the "heat source ambient air."
b) If the temperature level of the combustion engine 1 is not or no longer sufficient during or after previous combustion engine operation for direct heat transfer in the heating circuit via the heating heat exchanger 5, the heat can be used via the heat pump mode nonetheless.
c) In the event of continuous or sudden icing, the mode of operation with the combustion engine 1 as a heat source that is independent of the ambient temperature can be used.

Figure 4:
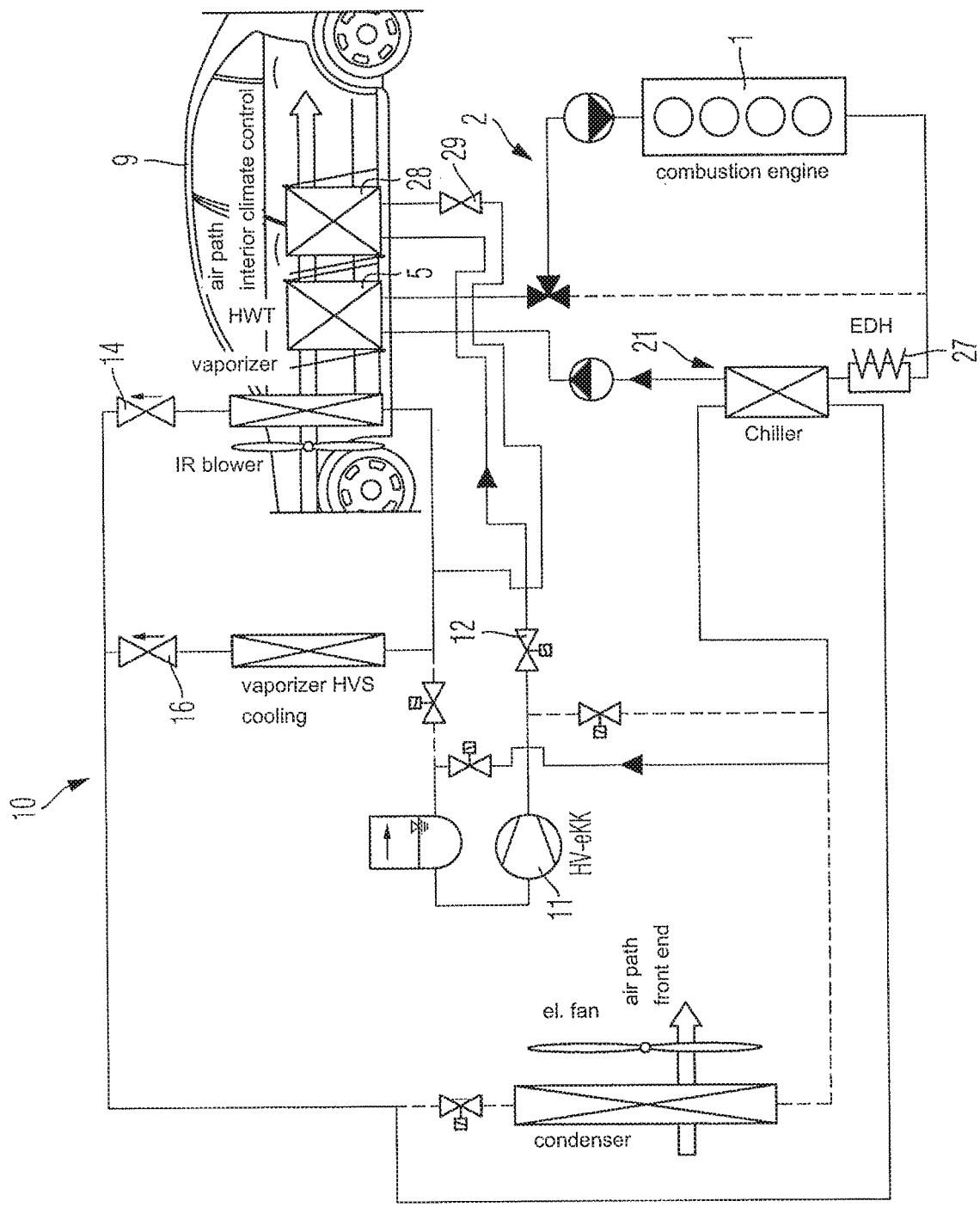

FIG. 4 shows an alternative system arrangement. Analogously to the system shown in FIG. 1, only one single fluid circuit 2 is provided here. In addition to the arrangement shown in FIG. 1, an electric heating device 27 is provided between the "hot side" of the combustion engine 1 and the first heat exchanger 21 by means of which the coolant circulated by pumping in the fluid circuit 2 can be heated.

The combustion engine 1 can be preheated analogously to the operational state shown in FIG. 1. Here, however, only the electric heater 27 without heat pump operation can be used.

In a first conceivable operational state, the combustion engine 1 is still so warm that the heat stored therein can be used to heat the passenger compartment of the vehicle 9, the air blown into the passenger compartment being heated via the heating heat exchanger 5. In this case, the electric heater 27 is not required.

In contrast, if the combustion engine 1 is cold or no longer sufficiently warm, additional heat can be supplied by the electric heater 27. One possibility is to have the heat fed via the electric heater be delivered directly via the heating heat exchanger 5 to the air blown into the passenger compartment.

Alternatively, it is also possible to use the coolant flowing through the first heat exchanger 21 (and hence the combustion engine 1 and/or the electric heating device 27) as a heat source for the heat pump circuit 10. In the first heat exchanger 21, the refrigerant circulated by pumping in the heat pump circuit 10 absorbs heat from the coolant of the coolant pump 3. The heated refrigerant is suctioned by the refrigerant compressor 11, compressed, and thus heated. The heated refrigerant can be pumped via the valve 12 through a second heating heat exchanger 28, where it delivers heat to the air flowing into the passenger compartment of the vehicle 9. After the heating heat exchanger 28, the compressed refrigerant is expanded in an expansion element 29. It can then be further expanded via the two vaporizers, i.e., in the expansion elements 14, 16. From the expansion elements 14, 16, the expanded refrigerant flows back to the first heat exchanger 21.

As already indicated, the combustion engine 1 and/or the electric heater 27 acts as a heat source, and the passenger compartment of the vehicle 9 acts as a heat sink in this operational state.

Figure 5:
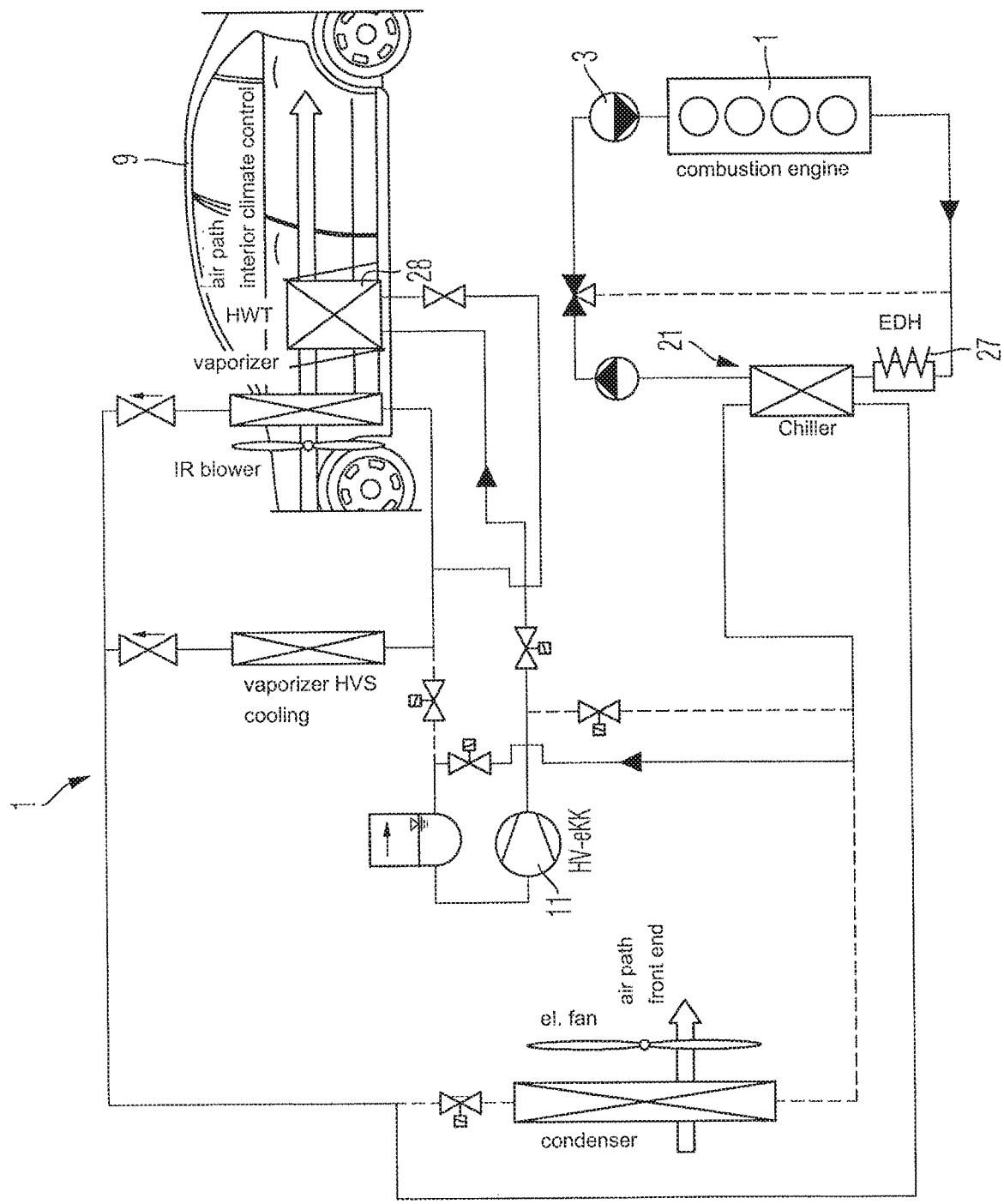

FIG. 5 describes another conceivable system arrangement. Here, unlike in FIGS. 1-4, only one single heat exchanger is provided, particularly a heating heat exchanger 28 through which refrigerant flows. Refrigerant coming from the combustion engine 1 is pumped through the electric heater 27 and the second heat exchanger 4 back to the suction side of the coolant pump 3. Depending on the temperature of the combustion engine, the electric heater 27 can be switched on as needed. In the first heat exchanger 21, the coolant delivers heat to the refrigerant circulated by pumping in the heat pump circuit 10. After compression of the refrigerant in the refrigerant compressor 11, the compressed and heated refrigerant is pumped through the refrigerant/air heat exchanger or heating heat exchanger 28, where is delivers heat to the air flowing into the passenger compartment of the vehicle 9. Otherwise, the functionality is identical to that in the arrangement shown in FIG. 4.

The combustion engine 1 can be preheated analogously to FIG. 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for thermal conditioning within a vehicle, comprising:
   providing a fluid circuit that heats and cools a combustion engine of the vehicle, wherein the fluid circuit comprises one or more valves configurable to fluidically separate the fluid circuit into a first sub-circuit and a second sub-circuit, and to fluidically combine the first sub-circuit and the second sub-circuit into the fluid circuit;
   providing a heat pump circuit that heats air flowing into a passenger compartment of the vehicle;
   transferring heat from the heat pump circuit to the fluid circuit, or the second sub-circuit of the fluid circuit, via configuring the one or more valves, such that the transferred heat heats the air flowing into the passenger compartment; and
   transferring heat from the first sub-circuit of the fluid circuit to the heat pump circuit and from the heat pump circuit to the second sub-circuit, via configuring the one or more valves, such that the transferred heat heats the air flowing into the passenger compartment.

2. The method as set forth in claim 1, wherein heat is transferred from the first sub-circuit of the fluid circuit flowing through the combustion engine to the heat pump circuit via a first heat exchanger.

3. The method as set forth in claim 2, wherein heat is transferred from the heat pump circuit via a second heat exchanger to the fluid circuit or to the second sub-circuit of the fluid circuit, and heat is transferred from the fluid circuit or the second sub-circuit of the fluid circuit via a heating heat exchanger to the air flowing into the passenger compartment of the vehicle.

4. The method as set forth in claim 2, wherein the combustion engine is preheated through transfer of heat produced by the heat pump circuit to the fluid circuit via a second heat exchanger.

5. The method as set forth in claim 1, wherein heat is transferred from the heat pump circuit via a second heat exchanger to the fluid circuit or to the second sub-circuit of the fluid circuit, and heat is transferred from the fluid circuit or the second sub-circuit of the fluid circuit via a heating heat exchanger to the air flowing into the passenger compartment of the vehicle.

6. The method as set forth in claim 5, wherein the combustion engine is preheated through transfer of heat produced by the heat pump circuit to the fluid circuit via the second heat exchanger.

7. The method as set forth in claim 1, wherein the combustion engine is preheated through transfer of heat produced by the heat pump circuit to the fluid circuit via a second heat exchanger.

* * * * *